US008817337B2

(12) United States Patent
Matsui

(10) Patent No.: US 8,817,337 B2
(45) Date of Patent: Aug. 26, 2014

(54) TRANSPORTABLE IMAGE PROCESSING APPARATUS

(75) Inventor: Masao Matsui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/698,598

(22) PCT Filed: Apr. 5, 2011

(86) PCT No.: PCT/JP2011/058613
§ 371 (c)(1),
(2), (4) Date: Nov. 16, 2012

(87) PCT Pub. No.: WO2011/145402
PCT Pub. Date: Nov. 24, 2011

(65) Prior Publication Data
US 2013/0063790 A1 Mar. 14, 2013

(30) Foreign Application Priority Data

May 17, 2010 (JP) ................................. 2010-113085

(51) Int. Cl.
*H04N 1/04* (2006.01)
(52) U.S. Cl.
USPC ........................... 358/474; 358/473; 358/496
(58) Field of Classification Search
CPC . A01G 3/08; H04N 13/0468; H04N 1/00519; H04N 1/00554; H04N 2201/0091; H04N 2201/0096; H04N 7/142; H04N 7/15
USPC ........................... 358/474, 473, 471, 496, 497
See application file for complete search history.

(56) References Cited

U.S. PATENT DOCUMENTS

| 4,789,876 A | 12/1988 | Miyai et al. |
| 5,175,583 A * | 12/1992 | Noh et al. ...................... 399/107 |
| 5,921,537 A * | 7/1999 | Matsui et al. ................. 270/1.03 |
| 6,694,116 B2 * | 2/2004 | Inoue et al. .................... 399/124 |
| 6,697,590 B2 * | 2/2004 | Inoue et al. .................... 399/124 |
| 6,788,426 B1 * | 9/2004 | Yamanaka et al. ............ 358/1.15 |
| 6,844,062 B2 * | 1/2005 | Matsui et al. ................. 428/370 |

(Continued)

FOREIGN PATENT DOCUMENTS

| JP | 63-124043 A | 5/1988 |
| JP | 63-265237 A | 11/1988 |

(Continued)

*Primary Examiner* — Negussie Worku
(74) *Attorney, Agent, or Firm* — Birch, Stewart, Kolasch & Birch, LLP

(57) ABSTRACT

A limiting member (91) includes a main body (911) and a convexity (912) formed at the upper face of the main body (911). The convexity (912) protrudes like a key toward the front-face side of a case (1). The case (1) has a hole (92) storing the limiting member (91), the hole (92) having an inclined face (921) that is inclined obliquely upward from the rear-face side to the front-face side of the case (1). The hole (92) has a depth larger than the height of the limiting member (91) on the rear-face side, and has substantially the same depth as the front-face side height of the main body (911) on the front-face side. A document cover (4) has a hole (93) including a U-shaped concavity (931) that is open on the rear-face side of the case (1), formed on the front-face side of the case (1). When the limiting member (91) is located on the front-face side of the case (1), the convexity (912) engages with the U-shaped concavity (931).

16 Claims, 9 Drawing Sheets

(56) References Cited

U.S. PATENT DOCUMENTS

| | | | |
|---|---|---|---|
| 7,065,312 B2 * | 6/2006 | Sasoh et al. | 399/124 |
| 7,778,569 B2 * | 8/2010 | Igarashi | 399/110 |
| 8,032,070 B2 * | 10/2011 | Suzaki | 399/401 |
| 8,041,255 B2 * | 10/2011 | Igarashi | 399/110 |
| 8,391,753 B2 * | 3/2013 | Takashima et al. | 399/260 |

FOREIGN PATENT DOCUMENTS

| | | |
|---|---|---|
| JP | 1-164449 U | 11/1989 |
| JP | 3-143670 A | 6/1991 |
| JP | 3-86361 U | 8/1991 |
| JP | 4-128772 A | 4/1992 |

* cited by examiner

TRANSPORTABLE IMAGE PROCESSING APPARATUS

TECHNICAL FIELD

The present invention relates to image processing apparatuses equipped with a scanner function such as copiers, multifunction machines, facsimiles and scanners, and relates to transportable image processing apparatuses including a handle for grasp.

BACKGROUND ART

Some image processing apparatuses are a type of installing a main body of the apparatus at a predetermined position for use and others are a type of transporting a compact and light main body of the apparatus to the place where a user wants to use for installation and use. The image processing apparatuses of a type of conveying a main body for use (hereinafter called transportable image processing apparatuses) include a handle for erecting the main body from the installation state where a document loading platen is horizontal for use so as to convey the apparatus. As the main body of such a transportable image processing apparatus is erected, the document loading platen stands straight, so that a document cover pressing a document on the document loading platen will not be fixed. When such a not fixed document cover opens, the document cover may be an obstacle for conveyance or may break during conveyance.

To cope with this, various types of transportable image processing apparatuses have been proposed to fix a document cover to a main body of the apparatus during conveyance (see Patent Document 1).

An image forming apparatus described in Patent Document 1 includes a lock lever attached to a document cover and a latch hook attached to a main body of the apparatus to latch the lock lever. This lock lever is attached rotatably around a fixed shaft. The lock lever has a free end on one side, the free end protruding from between the document cover and the main body when the document cover is closed. As the protruding free end of the lock lever is operated horizontally, a free end on the other side is engaged or disengaged with the latch hook. When the lock lever is latched by the latch hook, the document cover is fixed to the main body, and when the lock lever is disengaged from the latch hook, the document cover is openable/closable with respect to the main body.

In the image forming apparatus of Patent Document 1, the lock lever has to be always operated before conveyance to fix the document cover to the main body. On the other hand, the lock lever has to be always operated before use to let the document cover openable/closeable with respect to the main body. In this way, the image forming apparatus of Patent document 1 requires troublesome operations of the lock lever always before conveyance and use.

In another transportable image forming apparatus, a document cover is fixed to a main body using a magnet catch. Such a transportable image processing apparatus enables opening/closing of the document cover with respect to the main body by a simple operation. In the case of such a transportable image forming apparatus, however, the document cover will easily open by just a touch with an obstacle during conveyance, and so the document cover cannot be securely fixed to the main body.

CITATION LIST

Patent Literature

Patent Literature 1: Japanese Patent Application Laid-Open No. 63 (1988)-265237

SUMMARY OF INVENTION

Technical Problem

Then, it is an object of the present invention to provide a transportable image processing apparatus having a lock mechanism in a simple structure, whereby a document cover can be securely fixed to a main body of the apparatus during conveyance or the document cover can be openable/closable with respect to the main body during use without troublesome operations.

Solution to Problem

A transportable image processing apparatus of the present invention may be a copier, a multifunction machine, a facsimile, a scanner or the like, and includes a main body, a document cover and limiting means. The main body is provided with, at an upper face thereof, a document loading platen to load a document thereon. The document cover rotates around an end of the main body on the rear-face side as a rotation center to open/close an upper part of the document loading platen. When the main body is installed in a vertical state so as to direct the rear face side of the main body upward to let the document loading platen vertical, the limiting means limits rotation of the document cover from a state of closing the upper part of the document loading platen, and when the main body is installed in a horizontal state to let the document loading platen horizontal, the limiting means allows rotation of the document cover.

The limiting means includes a limiting member that shifts due to a self weight thereof to a limiting position so as to engage with the document cover when orientation of the main body is in the vertical state and shifts due to a self weight thereof to a retraction position so as not to engage with the document cover when orientation of the main body is in the horizontal state.

With this configuration, when the main body of the apparatus is installed so as to direct the rear face side of the main body upward to let the document loading platen vertical, i.e., during conveyance or strange of the transportable image processing apparatus, the limiting member is engaged with the document cover, whereby the upper part of the document loading platen is kept closed. On the other hand, when the main body is installed so as to let the document loading platen horizontal, i.e., during usage of the transportable image processing apparatus, the limiting member is not engaged with the document cover, whereby the document cover becomes openable/closable.

Preferably, the limiting means further includes a U-shaped first engaging part that is open on the rear-face side of the main body, the first engaging part being included in the document cover, and an inclined face that is inclined obliquely upward from the rear-face side to the front-face side of the main body, the inclined face being included in the main body, and the limiting member includes a second engaging part including a key-shaped protrusion directed to the front-face side of the main body and a contact face that comes into contact with the inclined face in a predetermined range, and at the limiting position, the second engaging part engages with the first engaging part and at the retraction position, the second engaging part does not engage with the first engaging part.

With this configuration, when the orientation of the main body is changed from the state of letting the document loading platen horizontal to the state of directing the rear-face side of the main body upward so as to let the document loading platen vertical, the limiting member shifts from the retraction position to the limiting position along the inclined face of the main body, so that the second engaging part engages with the first engaging part. On the other hand, the orientation of the main body is changed from the state of directing the rear-face side of the main body upward so as to let the document loading platen vertical to the state of letting the document loading platen horizontal, the limiting member shifts from the limiting position to the retraction position along the inclined face of the main body, so that the second engaging part does not engage with the first engaging part.

Thereby, the transportable image processing apparatus allows the limiting member to engage or not to engage with the document cover simply by changing the installation orientation of the main body, and so the document cover can be securely fixed to the main body or the document cover can be openable/closeable without troublesome operations.

Preferably, the limiting means further includes a U-shaped first engaging part that is open on the rear-face side of the main body, the first engaging part being included in the document cover, and the limiting member includes a free end that rotates about a rotation center in a same direction as the rotation center of the document cover and a second engaging part at the free end, the second engaging part including a key-shaped protrusion directed to the front-face side of the main body when the limiting member is in the limiting position, and at the limiting position, the second engaging part engages with the first engaging part and at the retraction position, the second engaging part does not engage with the first engaging part.

With this configuration, when the orientation of the main body is changed from the state of letting the document loading platen horizontal to the state of directing the rear-face side of the main body upward so as to let the document loading platen vertical, the limiting member rotates around a rotation center in the same direction as the rotation center of the document cover so as to shift from the retraction position to the limiting position, so that the second engaging part engages with the first engaging part. On the other hand, the orientation of the main body is changed from the state of directing the rear-face side of the main body upward so as to let the document loading platen vertical to the state of letting the document loading platen horizontal, the limiting member rotates about a rotation center in the same direction as the rotation center of the document cover to shift from the limiting position to the retraction position, so that the second engaging part does not engage with the first engaging part.

Thereby, the transportable image processing apparatus allows the limiting member to engage or not to engage with the document cover simply by changing the installation orientation of the main body, and so the document cover can be securely fixed to the main body or the document cover can be openable/closeable without troublesome operations.

Preferably the limiting means includes a concavity at a lower face of the document cover and a magnet catch to suck the document cover and the main body, and the limiting member includes a convexity to engage with the concavity of the document cover, and at the limiting position, the convexity engages with the concavity of the document cover and at the retraction position, the convexity does not engage with the concavity of the document cover.

With this configuration, the document cover becomes openable/closeable with respect to the main body of the apparatus using the magnet catch. When the orientation of the main body is changed from the state of letting the document loading platen horizontal to the state of directing the rear-face side of the main body upward so as to let the document loading platen vertical, the limiting means shifts from the retraction position to the limiting position. In this case, since the convexity engages with the concavity of the document cover, the magnet catch of the limiting means cannot be pressed down, so that the upper part of the document loading platen is kept closed. On the other hand, the orientation of the main body is changed from the state of directing the rear-face side of the main body upward so as to let the document loading platen vertical to the state of letting the document loading platen horizontal, the limiting member shifts from the limiting position to the retraction position. In this case, the convexity does not engage with the concavity of the document cover, which means that the magnet catch can be pressed down, and the document cover becomes openable/closable with respect to the main body.

Thereby, the magnet catch can be pressed down or cannot be pressed down simply by changing the installation orientation of the main body without troublesome operations, and so the document cover can be more securely fixed to the main body or the document cover can be openable/closeable.

Preferably the limiting means is disposed in a vicinity of one end on a front-face side of the document loading platen.

With this configuration, the limiting means is disposed on the opening/closing side of the document cover. Thereby, the limiting means can fix the document cover to the main body of the apparatus with a small force.

Preferably the transportable image processing apparatus further includes a handle attached on the rear-face side of the main body. With this configuration, the transportable image processing apparatus can be conveyed while grasping the handle. Thereby, the limiting means of the transportable image processing apparatus can be disposed at the limiting position during conveyance so as to securely fix the document cover to the main body of the apparatus.

Advantageous Effects of Invention

A transportable processing apparatus of the present invention has limiting means in a simple structure, whereby a document cover can be securely fixed to a main body of the apparatus during conveyance or the document cover can be openable/closable with respect to the main body during use without troublesome operations.

DESCRIPTION OF EMBODIMENTS

The following describes a transportable image processing apparatus according to one embodiment of the present invention, with reference to the drawings. Although the following describes a transportable image forming apparatus as an exemplary transportable image processing apparatus, they may be a transportable apparatus having a document cover such as a copier, a multifunction machine, a facsimile or a scanner.

Figure 1A:
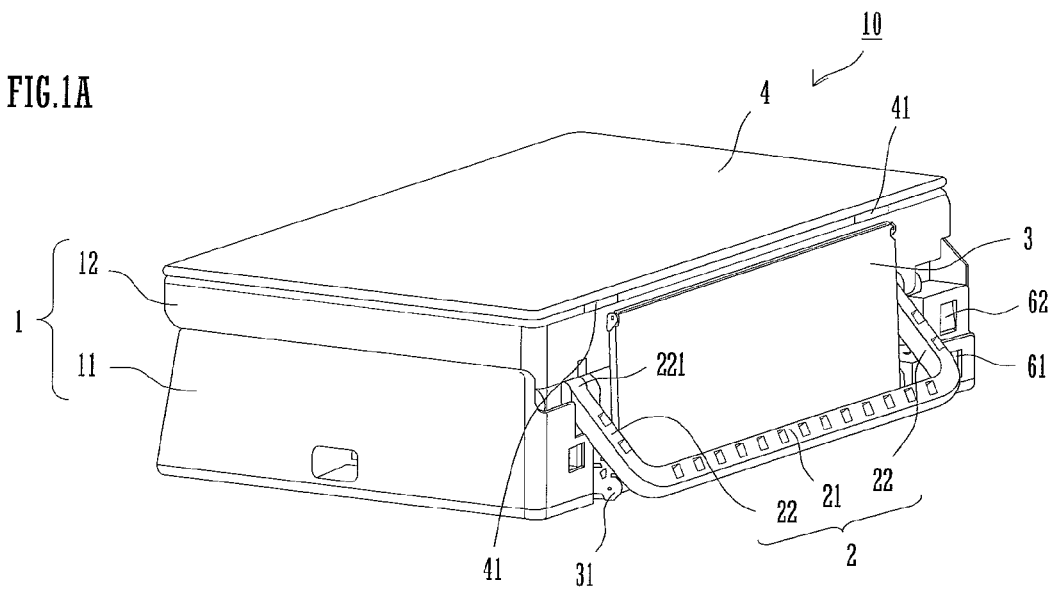
FIG. 1A briefly shows a front face and a rear face of a transportable image forming apparatus.

As shown in FIG. 1A, a transportable image forming apparatus 10 includes a case 1 (corresponding to a main body of the present invention) and includes a handle (corresponding to a handle of the present invention) 2 and a sheet output may 3 on the rear face of the case 1 and a document cover 4 on the upper face of the case 1. The case 1 includes a main body 11 and a lid 12. The main body 11 contains an image forming section 7 (see FIG. 3) therein, and the lid 12 contains an image reading section 8 (see FIG. 3) therein.

The handle 2 includes a grasp portion 21 to be grasped during conveyance of the transportable image forming apparatus 10 and bases 22, 22 bending from both ends of the grasp portion 21 at right angles for extension. Each base 22 has an open end 221 as a first end that is supported rotatably at the rear face of the case 1. The sheet output tray 3 has a lower end 31 that is rotatably supported at the rear face of the case 1, and stores sheets subjected to image formation by the image forming section 7. The space between the internal side faces of the left and right bases 22 of the handle 2 is set longer than the width of the sheet output tray 3. The left and right bases 22 are positioned externally in the width direction of the sheet output tray 3.

Figure 2A:
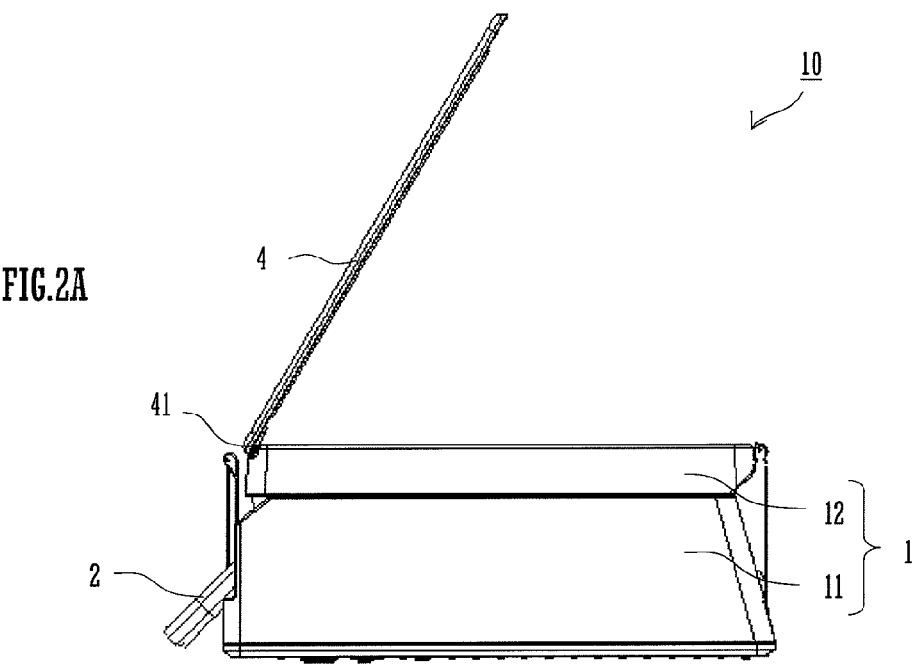
FIG. 2A briefly shows the transportable image forming apparatus during usage.

The document cover 4 is rotatably supported by a rear-face side end 41 provided on the rear-face side of the case 1 so as to let the upper face of the case 1 open during opening of the document cover 4 and cover the upper face of the case 1 during closing thereof (see FIG. 2A). On the upper face of the case 1 is provided a document loading platen 42. At an end part on the front-face side of the document loading platen 42 is provided a lock mechanism 9 (corresponding to limiting means of the present invention). The lock mechanism 9 switches between a state of letting the document cover 4 openable/closeable and a state of limiting the rotation of the closed document cover 4 in accordance with the orientation of the case 1.

The main body 11 further includes a receptacle 61 for a power cord and a power supply switch 62 on the rear face thereof.

Figure 1B:
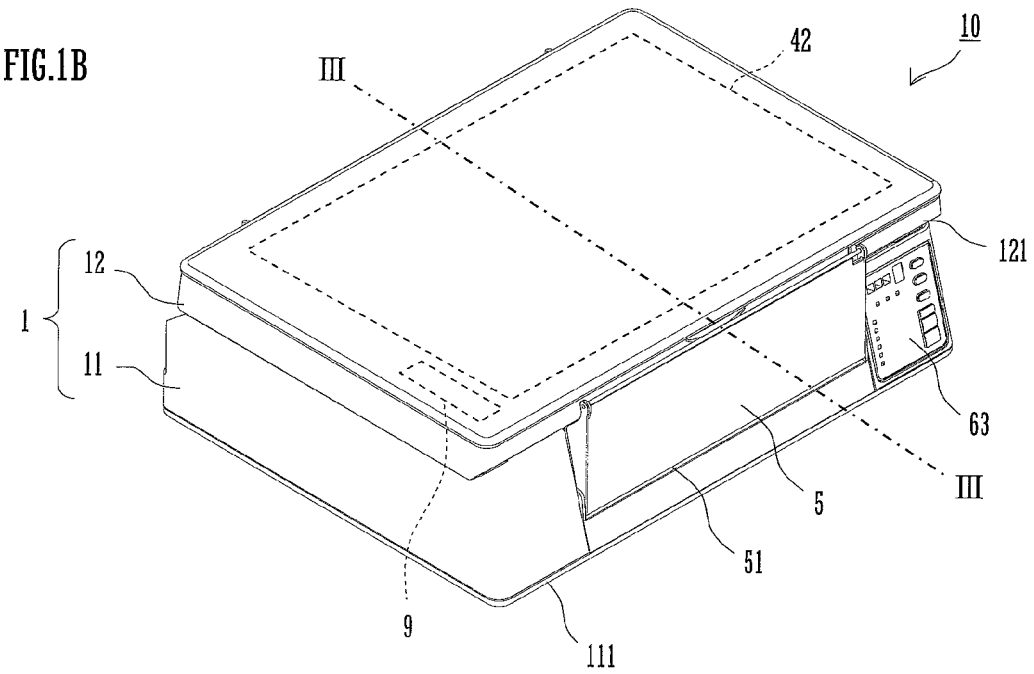
FIG. 1B briefly shows a rear face of a transportable image forming apparatus.

As shown in FIG. 1B, the transportable image forming apparatus 10 includes a sheet feeding tray 5 and an operation panel 63 on a front face of the case 1. The sheet feeding tray 5 has a lower end 51 that is supported rotatably at the front face of the case 1, and stores sheets to be fed to the image forming section 7. The operation panel 63 accepts various input operations of image forming conditions such as density setting, copy quantity setting and magnification setting.

Figure 2B:
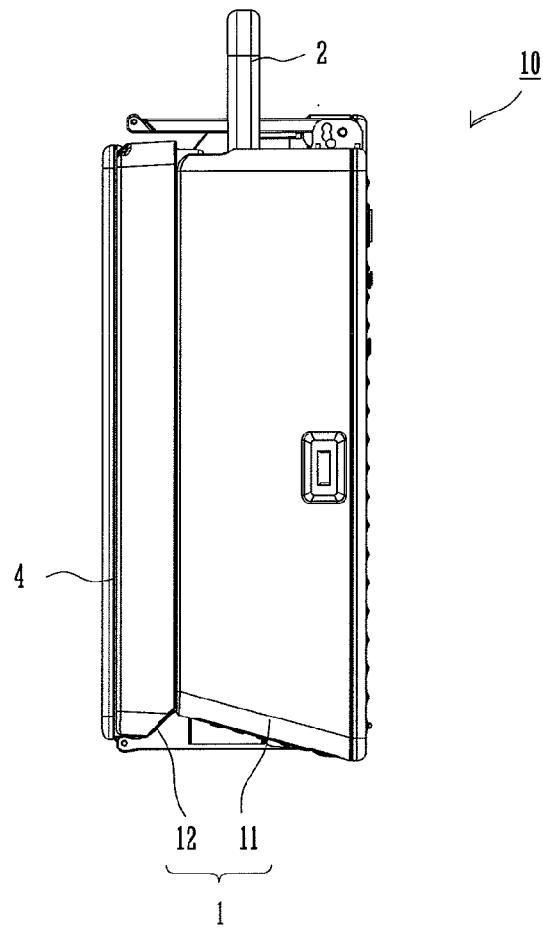
FIG. 2B briefly shows the transportable image forming apparatus during conveyance or storage.

On the front-face side of the case 1, a line connecting a lower end 111 of the main body 11 and a front face 121 of the lid 12 is at right angles to the bottom face of the main body 11 and the upper face of the lid 12. The transportable image forming apparatus 10 can be placed on a floor during conveyance or storage while letting the front face of the lid 12 downward and horizontal (see FIG. 2B).

During image formation, the transportable image forming apparatus 10 is placed on a desk, for example, while letting the upper face of the case 1 horizontal, and during conveyance the rear face of the case 1 is directed upward by grasping the handle 2. Since the transportable image forming apparatus 10 includes the lock mechanism 9 operable in accordance with the orientation of the case 1, the document cover 4 becomes openable/closeable when the upper face of the case 1 is horizontal, and the document cover 4 can be fixed to the case 1 when the rear face of the case 1 is directed upward.

Figure 3:
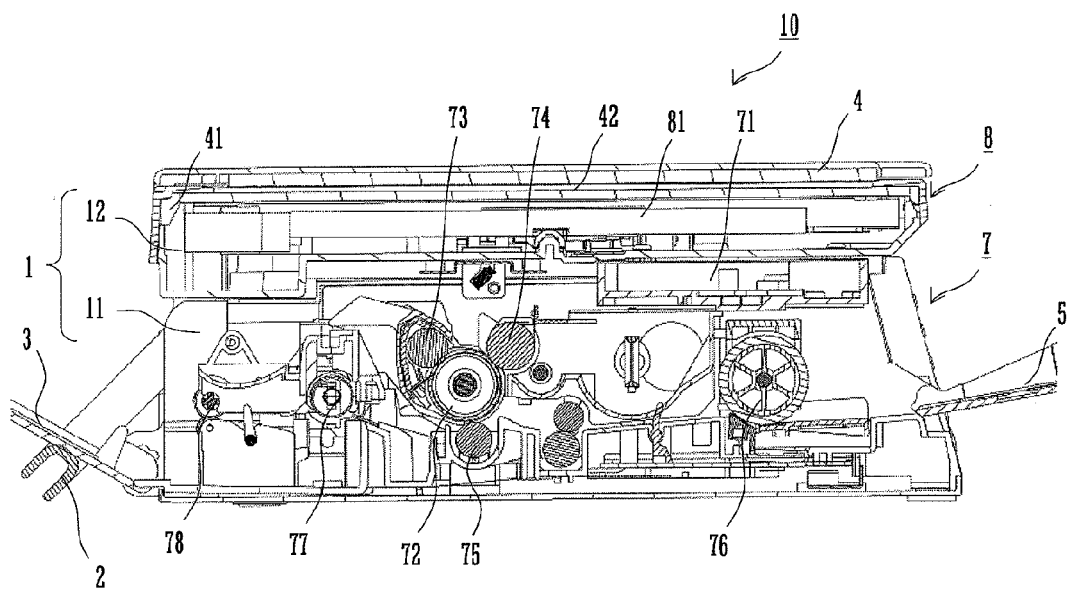
FIG. 3 is a schematic cross-sectional view taken along the line III-III in FIG. 1B of the transportable image forming apparatus.

As shown in FIG. 3, the transportable image forming apparatus 10 includes the image forming section 7 and the image reading section 8 performing electrophotographic image forming as one example.

The image reading section 8 is provided with, below the document loading platen 42, a light source that irradiates a document with light and a scanning unit 81 including three mirrors and a lens guiding the light reflected from the document to a CCD. The image reading section 8 reads an image of a document loaded on the document loading platen 42.

The image forming section 7 is provided with a laser unit 71 that emits laser light in accordance with the image of the document ready by the image reading section 8 and an optical system guiding the laser light emitted from the laser unit 71 to a photoreceptor drum 72. As is known well, around the photoreceptor drum 72 are disposed a charger 73 to charge the photoreceptor drum 72 at a predetermined electrical potential, a developing unit 74 to make an electrostatic latent image formed on the photoreceptor drum 72 visible as a toner image, a transfer roller 75 to transfer the visible toner image on to a fed sheet and the like. The image forming section 7 further is provided with a pickup roller 76 to take sheets inside the main body from the sheet feeding tray 5, a fixing roller 77 to fix the toner image transferred to the sheet, a sheet output roller 78 to output a sheet to the sheet output tray 3 outside the main body, and the like.

Next, the following describes the lock mechanism 9 that makes the document cover 4 openable/closeable during image formation and fixes the document cover 4 to the case 1 during conveyance, by way of embodiments.

Embodiment 1

As shown in FIGS. 4A, 4B, 5A and 5B, the lock mechanism 9 is made up of a limiting member 91, a hole 92 provided in the case 1 and a hole 93 provided in the document cover 4.

Figure 4:
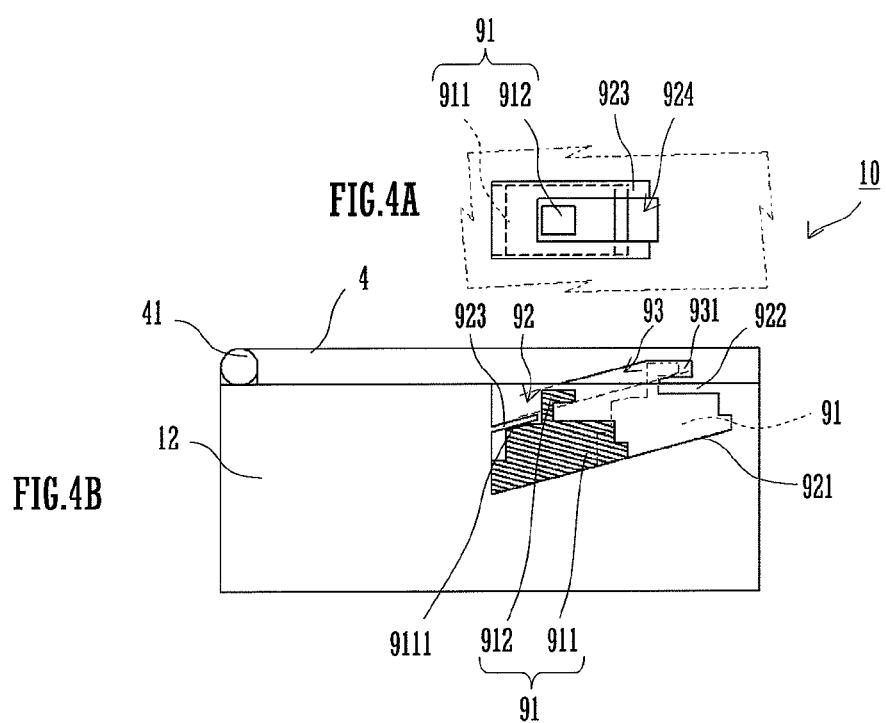
FIG. 4A is a top view showing the configuration of a lock mechanism of Embodiment 1 in a lock cancel state.
FIG. 4B is a sectional side view showing the configuration of a lock mechanism of Embodiment 1 in a lock cancel state.

The limiting member 91 is stored in the hole 92 of the case 1. The limiting member 91 includes a main body 911 and a convexity (corresponding to a second engaging part of the present invention) 912 formed at the upper face of the main body 911. As shown in FIG. 4B, when the case 1 is installed while letting the upper face thereof horizontal, the bottom face of the main body 911 has an inclined face that is inclined upward from the rear-face side to the front-face side of the case 1. The upper face of the main body 911 on the rear-face side has an inclined face 9111 of the same inclination angle as that of the bottom face of the main body 911. The convexity 912 protrudes like a key toward the front-face side of the case 1.

The hole 92 of the case 1 has an inclined face 921 that is inclined obliquely upward from the rear-face side to the front-face side of the case 1. The inclined face 921 of the hole 92 has a same inclination angle as that of the bottom face of the main body 911 of the limiting member 91. Thereby, the bottom face of the main body 911 of the limiting member 91 comes into contact with the inclined face 921 of the hole 92. Therefore, when the orientation of the case 1 is changed from the upper-face horizontal state to the rear-face upward side, then the limiting member 91 shifts from the rear-face side position to the front-face side position of the case 1 along the inclined face 921 of the hole 92 due to the self weight thereof. When the orientation of the case 1 is changed from the rear-face upward state to the upper-face horizontal side, then the limiting member 91 shifts from the front-face side position to the rear-face side position of the case 1 along the inclined face 921 of the hole 92 due to the self weight thereof.

The hole 92 has a depth larger than the height of the limiting member 91 on the rear-face side, and has substantially the same depth as the front-face side height of the main body 911 of the limiting member 91 on the front-face side. Thereby, when the limiting member 91 is located on the rear-face side of the case 1, the main body 911 and the convexity 912 are disposed in the hole 92, and when the limiting member 91 is located on the front-face side of the case 1, the main body 911 only is disposed in the hole 92 and the convexity 912 is allowed to protrude from the hole 92.

On the front-face side and the rear-face side of the hole 92 are provided limiting parts 922 and 923, respectively, so as to keep the limiting member 91 within the hole 92. The limiting part 922 is configured so that, when the limiting member 91 is located on the front-face side of the case 1, the lower face of the limiting part 922 becomes horizontal while having a slight gap between the front-face side upper face of the main body 911 and the upper face thereof becomes flush with the upper face of the hole 92. The limiting part 922 is formed, when the limiting member 91 is located on the front-face side of the case 1, from the front-face side of the hole 92 to the contact place with the convexity 912 of the limiting member 91.

The limiting part 923 has a lower face that is formed, when the limiting member 91 is located on the rear-face side of the case 1, from the place having a slight gap with the inclined face 9111 of the main body 911 of the limiting member 91 on the rear-end side to the rear-face side lower face position of the limiting part 922 on the front-end side, and is an inclined face of the same inclination angle that of the inclined face 921. Since the inclined face 9111 of the limiting member 91 of the limiting member 91 has the same inclination angle as that of the lower face of the limiting part 923, there is a slight gap between the inclined face 9111 of the limiting member 91 and the lower face of the limiting part 923. As a result, when the limiting member 91 shifts from the rear-face side position to the front-face side position of the case 1 or from the front-face side position to the rear-face side position, the main body 911 does not come into contact with the limiting part 923, so that such shift can be performed smoothly.

Figure 5:
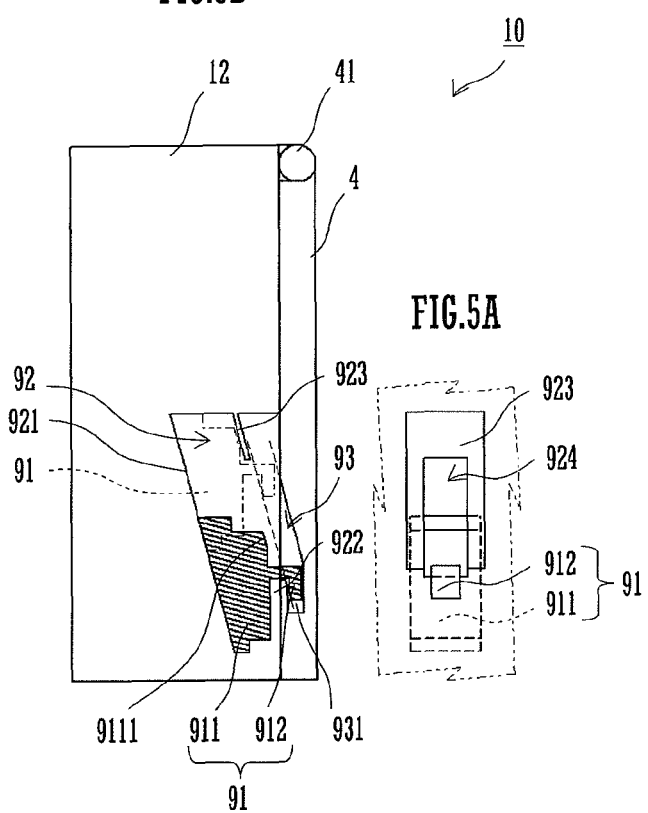
FIG. 5A is a top view showing the configuration of a lock mechanism of Embodiment 1 in a lock state.
FIG. 5B is a sectional side view showing the configuration of a lock mechanism of Embodiment 1 in a lock state.

The limiting part 923 has an opening 924 formed therein. The opening 924 is formed from the position where the convexity 912 on the rear-face side comes into contact with the limiting part 923 when the limiting member 91 is located on the rear-face side of the case 1 to the position where the convexity 912 on the front-face side comes into contact with the limiting part 922 when the limiting member 91 is located on the front-face side of the case 1. As shown in FIG. 4A and FIG. 5A, the opening 924 has a width in the side-face direction of the case 1 smaller than that of the main body 911 of the limiting member 91 and larger than that of the convexity 912 of the limiting member 91. The opening 92 stores the main body 911 of the limiting member 91 inside by means of the limiting parts 922 and 923 and lets the convexity 912 of the limiting member 91 protrude through the opening 924. Therefore the limiting member 91 is kept inside the hole 92.

Further as shown in FIG. 4B, the hole 93 of the document cover 4 is formed at a position opposed to the hole 92 of the case 1 with the upper face of the case 1 sandwiched therebetween. The hole 93 has an upper face that is an inclined face inclining upward from the rear-face side of the front-face side of the case 1. This inclined face has the same inclination angle that of the inclined face 921 of the hole 92, which means that this inclined face is parallel to the path where the convexity 912 passes during the shift of the limiting member 91 from the rear-face side position to the front-face side position of the case 1 or from the front-face side position to the rear-face side position.

The hole 93 includes a U-shaped concavity (corresponding to a first engaging part of the present invention) 931 that is open on the rear-face side of the case 1, formed on the front-face side of the case 1. When the limiting member 91 is located on the front-face side of the case 1, the hole 93 stores the convexity 912 of the limiting member 91 protruding from the hole 92 inside. Since the convexity 912 of the limiting member 91 has a key shape, the convexity 912 engages with the U-shaped concavity 931. At this time, the front-face side of the main body 911 of the limiting member 91 engages with the limiting part 922 of the hole 92.

When the case 1 is installed while letting the upper face thereof horizontal, the limiting member 91 is located at a retraction position on the rear-face side of the case 1. At this time, since the limiting member 91 is disposed within the hole 92 of the case 1, the convexity 912 does not engage with the concavity 931 of the hole 93, and the front-face side of the main body 911 does not engage with the limiting part 922 of the hole 92, the document cover 4 can be openable and closable. On the other hand, as shown in FIG. 5B where the rear face of the case 1 is directed upward, the limiting member 91 is located at a limiting position on the front-face side of the case 1. At this time, since the convexity 912 of the limiting member 91 engages with the concavity 931 of the hole 93 and the front-face side of the main body 911 engages with the limiting part 922 of the hole 92, rotation of the document cover 4 from the closed state can be limited. That is, the limiting member 91 can shift due to the self weight thereof between the limiting position to limit the rotation of the document cover 4 from the closed state and the retraction position letting the document cover 4 rotatable.

Figure 6:
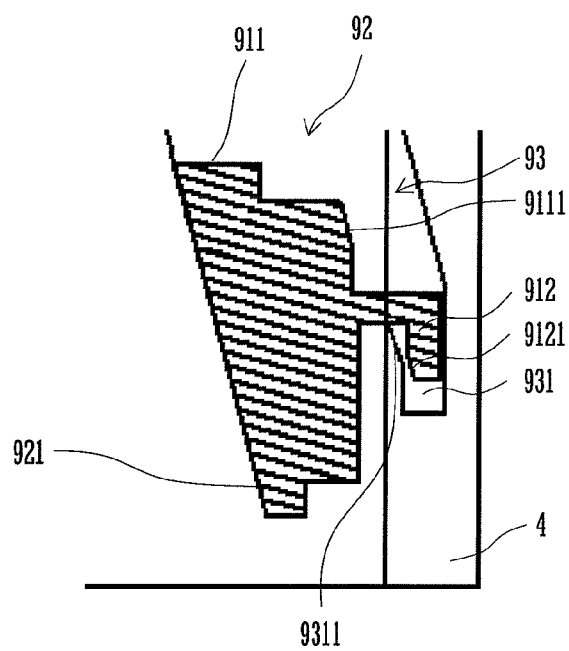
FIG. 6 is a partially enlarged view of a lock mechanism of Embodiment 1.

Further as shown in FIG. 6, the convexity 912 of the limiting member 91 has a chamfered front end so that an inclined face 9121 is formed so as to be inclined upward from the rear-face side of the front-face side of the case 1. The concavity 931 of the hole 93 of the document cover 4 also is chamfered so as to form an inclined face 9311 that is inclined upward from the rear-face side to the front-face side of the case 1. The inclined faces 9121 and 9311 are formed to be opposed to each other. The inclined faces 9121 and 9311 have an inclination angle equal to the inclination angle of the inclined face 921 of the hole 92 of the case 1 or a slightly steeper inclination angle than that of the inclined face 921.

Thereby, since the convexity 912 can smoothly cancel the engagement with the concavity 931 of the hole 93, the limiting member 91 can shift smoothly from the limiting position to the retraction position. Note that the inclined faces 9121 and 9311 may not be formed.

In this Embodiment 1, the entire bottom face of the main body 911 of the limiting member 91 is in contact with the inclined face 921 of the hole 92. Instead, the bottom face of the main body 911 may be in contact with the inclined face 921 of the hole 92 in a predetermined range as long as it can shift along the inclined face 921 of the hole 92.

Embodiment 2

Figure 7A:
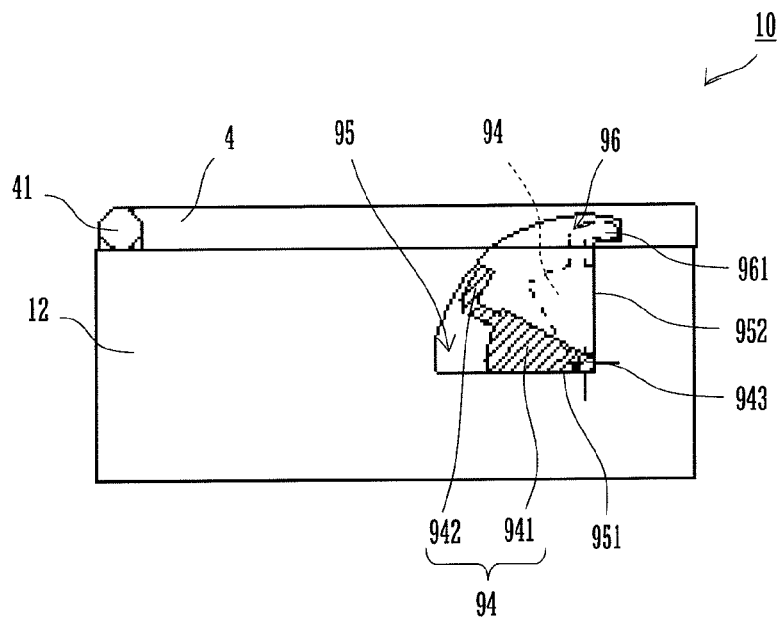
FIG. 7A is a sectional side view showing the configuration of a lock mechanism of Embodiment 2 in a lock cancel state.
Figure 7B:
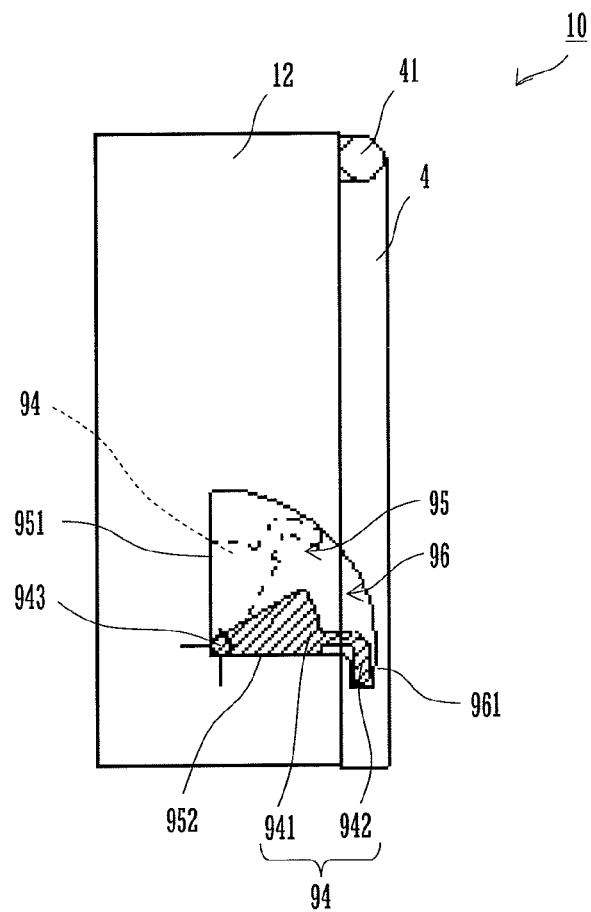
FIG. 7B is a sectional side view showing the configuration of a lock mechanism of Embodiment 2 in a lock state.

As shown in FIGS. 7A and 7B, a lock mechanism 9 is made up of a limiting member 94, a hole 95 provided in a case 1 and a hole 96 provided in a document cover 4.

The limiting member 94 is stored in the hole 95 of the case 1. The limiting member 94 includes a main body 941 and a convexity (corresponding to a second engaging part of the present invention) 942 formed at the main body 941. In a plan view from a side face of the case 1, the main body 941 has a fan shape making an acute angle at the front end and the convexity 942 is formed externally of the fan shape. The main body 941 is configured so that the outside thereof is rotatable about a center 943 of the fan shape that is a rotation center in the same direction as that of the rear-face side end. The convexity 942 has a substantial key shape, and as, shown in FIG. 7B, when the rear face of the case 1 is directed upward, the convexity 942 protrudes to the front-face side of the case 1 while making an arc.

As shown in FIG. 7A, in the plan view from a side face of the case 1, the hole 95 of the case 1 and the hole 96 of the document cover 4 in the closed state of the document cover 4 form a fan shape where the holes 95 and 96 are overlapped and the front end makes a substantially 90 degrees. When the case 1 is installed while letting the upper face horizontal, the center of this fan shape resides a point where a horizontal bottom side 951 of the hole 95 of the case 1 and a side 952 on the front-face side of the case 1 extending vertically from the bottom side 951 intersect. This fan shape forms an arc from the rear-face side to the upper-face side of the case 1 while having the bottom side 951 and the side 952 as a radius thereof.

The limiting member 94 has its center 943 coinciding with the center of a fan shape formed with the holes 95 and 96. Thereby, when the orientation of the case 1 is changed from the state of letting the upper face of the case 1 horizontal for installation to the rear-face upward state, the limiting member 94 rotates about the center 943 as a rotation center due to the self weight thereof, thus shifting from the bottom-face side position of the case 1 to the front-face side position. When the orientation of the case 1 is changed from the rear-face upward state to the state of letting the upper face of the case 1 horizontal for installation, the limiting member 94 rotates about the center 943 as a rotation center due to the self weight thereof, thus shifting from the front-face side position of the case 1 to the bottom-face side position.

The bottom side 951 of the hole 95 has a length longer than the sum of the radius of the main body 941 of the limiting member 94 and the height of the convexity 942. The hole 95 has a depth on the front-face side that is substantially the same as the radius of the main body 941 of the limiting member 94. Thereby, when the limiting member 94 is located on the bottom-face side of the case 1, the main body 941 and the convexity 942 are disposed within the hole 95, and when it is located on the front-face side of the case 1, the main body 941 only is disposed within the hole 95 and lets the convexity 942 protrude from the hole 95.

The hole 96 of the document cover 4 has a depth larger than the height of the convexity 942 of the limiting member 94. The hole 96 includes a U-shaped concavity (corresponding to a first engaging part of the present invention) 961 that is open on the rear-face side of the case 1, the U-shaped concavity being formed on the front-face side of the case 1. The concavity 961 is formed having arc shapes on the upper-face side and the lower-end side of the case 1. The upper-face side arc of the concavity 961 is formed along the arc having the bottom side 951 and the side 952 of the hole 95 as a radius and from the rear-face side to the upper-face side of the case 1. Thereby, when the limiting member 94 is located on the front-face side of the case 1, the convexity 942 of the limiting member 94 is disposed inside the hole 96 of the document cover 4. Further, the convexity 942 of the limiting member 94 has a key shape making an arc, whereby the convexity 942 engages with the U-shaped concavity 961 making an arc.

As shown in FIG. 7A, when the case 1 is installed while letting the upper face thereof horizontal, the limiting member 94 is located at a retraction position on the bottom-face side of the case 1. At this time, since the limiting member 94 is disposed within the hole 95 of the case 1, the document cover 4 can be openable and closable. On the other hand, as shown in FIG. 7B where the rear face of the case 1 is directed upward, the limiting member 94 is located at a limiting position on the front-face side of the case 1. At this time, since the convexity 942 of the limiting member 94 engages with the hole 96, rotation of the document cover 4 from the closed state can be limited. That is, the limiting member 94 can shift due to the self weight thereof between the limiting position to limit the rotation of the document cover 4 from the closed state and the retraction position letting the document cover 4 rotatable.

Similarly to Embodiment 1, the front end of the convexity 942 of the limiting member 94 and the concavity 961 of the hole 96 in the document cover 4 may be chamfered. Thereby, since the convexity 942 can smoothly cancel the engagement with the concavity 961 of the hole 96, the limiting member 94 can shift smoothly from the limiting position to the retraction position. Note that the front end of the convexity 942 of the limiting member 94 and the concavity 961 of the hole 96 in the document cover 4 may not be chamfered.

In this Embodiment 2, in the plan view from a side face of the case 1, the side 952 of the hole 95 of the case 1 is formed vertically to the bottom side 951. Instead, the side 952 may be inclined from the rear-face side to the front-face side of the case 1 in the downward direction. In this case, the bottom side 951 and the side 952 of the hole 95 of the case 1 intersect at a position closer to the front-face side of the case 1. Thereby, rotation of the limiting member 94 from the limiting position to the retraction position is facilitated, and so the shift from the limiting position to the retraction position can be performed more smoothly.

In this Embodiment 2, the depth of the hole 95 of the case 1 on the front-face side, the depth of the hole 96 of the document cover 4, the radius of the main body 941 of the limiting member 94 and the length of the convexity 942 of the limiting member 94 are not limited to those mentioned above. As shown in FIG. 7B, they may be set so that, when the limiting member 94 is disposed at the limiting position, the convexity 942 protruding from the hole 95 of the case 1 engages with the concavity 961 of the hole 96 of the document cover 4.

Embodiment 3

Figure 8A:
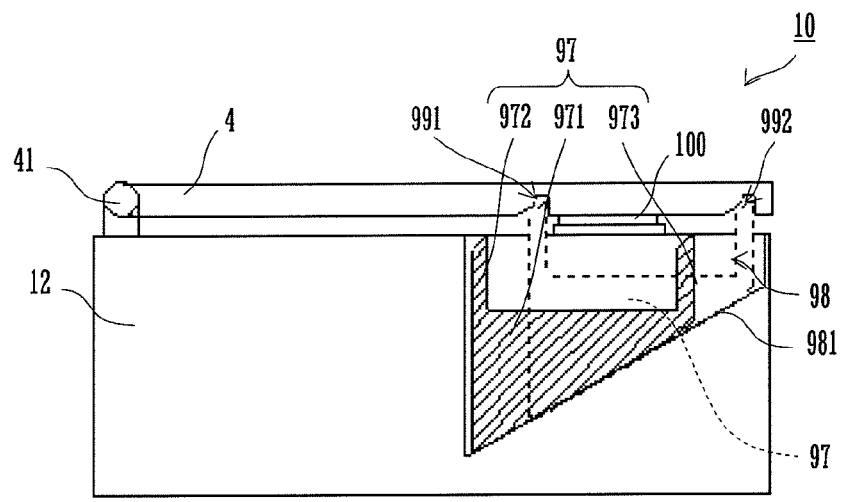
FIG. 8A is a sectional side view showing the configuration of a lock mechanism of Embodiment 3 in a lock cancel state.
Figure 8B:
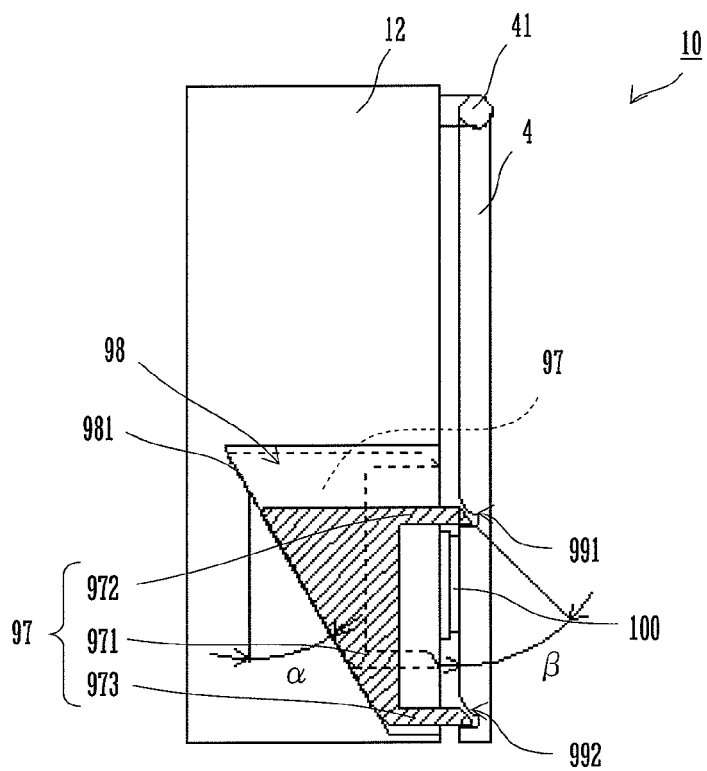
FIG. 8B is a sectional side view showing the configuration of a lock mechanism of Embodiment 3 in a lock state.

As shown in FIGS. 8A and 8B, a lock mechanism 9 is made up of a limiting member 97, a hole 98 provided in a case 1, holes 991, 992 provided in a document cover 4 and a magnet catch 100.

The magnet catch 100 is provided at an upper face of the case 1, and a suction plate (such as iron plate) to suck the magnet catch 100 is provided at a lower face of the document cover 4. Note that the suction plate may be provided at the upper face of the case 1 so as to suck the magnet catch 100 at the lower face of the document cover 4. The magnet catch 100 includes a magnet, and suction and detachment with respect to the suction plate may be performed by moving the magnet vertically to the case 1.

The limiting member 97 is stored in the hole 98 of the case 1. The limiting member 97 includes a main body 971 and convexities (corresponding to a second engaging part of the present invention) 972 and 973 formed at the upper face of the main body 971. As shown in FIG. 8A, when the case 1 is installed while letting the upper face horizontal, the main body 971 has a horizontal upper face and a bottom face that is an inclined face inclining upward from the rear-face side to the front-face side of the case 1. The convexities 972 and 973 have lengths longer than the vertical movement distance of the magnet making up the magnet catch 100.

The hole 98 of the case 1 has an inclined face 981 that is inclined obliquely upward from the rear-face side to the front-face side of the case 1. The inclined face 981 of the hole 98 is formed to have the same inclination angle as that of the bottom face of the main body 971 of the limiting member 97. Thereby, the bottom face of the main body 971 of the limiting member 97 comes into contact with the inclined face 981 of the hole 98. Therefore when the orientation of the case 1 is changed from the state of letting the upper face of the case 1 horizontal for installation to the rear-face upward state, the limiting member 97 shifts due to the self weight thereof from the rear-face side position to the front-face side position of the case 1 along the inclined face 981 of the hole 98. When the orientation of the case 1 is changed from the rear-face upward state to the state of letting the upper face of the case 1 horizontal for installation, the limiting member 97 shifts due to the self weight thereof from the front-face side position to the rear-face side position of the case 1 along the inclined face 981 of the hole 98.

The hole 98 has a depth larger than the height of the limiting member 97 on the rear-face side, and has substantially the same depth as the front-face side height of the main body 971 of the limiting member 97 on the front-face side. Thereby, when the limiting member 97 is located on the rear-face side of the case 1, the main body 971 and the convexities 972 and 973 are disposed in the hole 98, and when the limiting member 97 is located on the front-face side of the case 1, the main body 971 only is disposed in the hole 98 and the convexities 972 and 973 are allowed to protrude from the hole 98.

As shown in FIG. 8B, the holes 991, 992 (corresponding to a first engaging part of the present invention) of the document cover 4 are formed at positions where the convexities 972 and 973 of the limiting member 97, respectively, protrude when the rear face of the case 1 is directed upward. The holes 991, 992 have depths larger than the heights of the convexities 972, 973 of the limiting member 97. Thereby, when the limiting member 97 is located on the front-face side of the case 1, the convexities 972, 973 of the limiting member 97 are disposed within the holes 991 and 992 of the document cover 4.

When the case 1 is installed while letting the upper face thereof horizontal, the limiting member 97 is located at a refraction position on the rear-face side of the case 1. At this time, since the limiting member 97 is disposed within the hole 98 of the case 1 and the convexities 972, 973 do not engage with the holes 991 and 992, respectively, the magnet catch 100 can be pressed down, so that the document cover 4 can be openable and closable. On the other hand, as shown in FIG. 8B where the rear face of the case 1 is directed upward, the limiting member 97 is located at a limiting position on the front-face side of the case 1. At this time, since the convexities 972 and 973 of the limiting member 97 engage with the holes 991 and 992, respectively, the magnet catch 100 cannot be pressed down, so that rotation of the document cover 4 from the closed state can be limited. That is, the limiting member 97 can shift due to the self weight thereof between the limiting position to limit the rotation of the document cover 4 from the closed state and the retraction position letting the document cover 4 rotatable.

Figure 9:
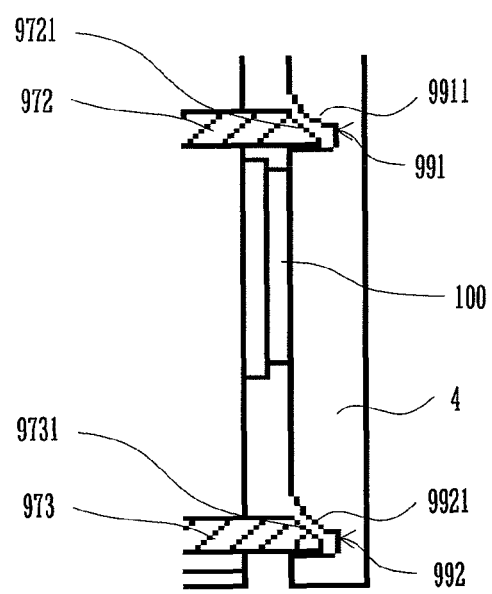
FIG. 9 is a partially enlarged view of a lock mechanism of Embodiment 3.

Further as shown in FIG. 9, the front ends of the convexities 972 and 973 of the limiting member 97 are chamfered so as to form inclined faces 9721 and 9731 that are inclined upward from the rear-face side to the front-face side of the case 1. The holes 991 and 992 of the document cover 4 also are chamfered so as to form inclined faces 9911 and 9921 that are inclined upward from the rear-face side to the front-face side of the case 1. The inclined faces 9721 and 9731 and the inclined faces 9911 and 9921 are formed so as to face each other. The inclination angle β of the inclined faces 9721, 9731, 9911 and 9921 may be equal to the inclination angle α of the inclined face 981 of the hole 98 of the case 1 or may be slightly steeper than that of the inclination angle α of the inclined face 981. Thereby, since the convexities 972 and 973 of the limiting member 97 can smoothly cancel the engagement with the holes 991 and 992, the limiting member 97 can shift smoothly from the limiting position to the retraction position.

In this Embodiment 3, the depth of the hole 98 of the case 1 on the front-face side, the depths of the holes 991 and 992 of the document cover 4, the length of the main body 971 of the limiting member 97 on the front-face side and the lengths of the convexities 972 and 973 of the limiting member 97 are not limited to those mentioned above. As shown in FIG. 8(B), they may be set so that, when the limiting member 97 is disposed at the limiting position, the length of the convexities 972 and 973 protruding from the hole 98 of the case 1 is longer than the vertical movement distance of the magnet included in the magnet catch 100. That is, these dimensions may be set so that, when the limiting member 97 is disposed at the limiting position, the convexities 972 and 973 of the limiting member 97 engage with the holes 991 and 992 of the document cover 4 to make it impossible to press down the magnet catch 100.

In this Embodiment 3, the limiting member 97 moves along the inclined face 981 of the hole 98 of the case 1 so as to shift between the limiting position and the retraction position due to the self weight thereof. Instead, as in Embodiment 2, the limiting member 97 may have a fan shape making an acute angle at the front end and includes a convexity externally of the fan shape so as to rotate the outside about the front end as a rotation center. In this case, the limiting member 97 rotates its outside due to the self weight thereof so as to shift between the limiting position and the retraction position.

In this Embodiment 3, the entire bottom face of the main body 971 of the limiting member 97 is in contact with the inclined face 981 of the hole 98. Instead, the bottom face of the main body 971 may be in contact with the inclined face 981 of the hole 98 in a predetermined range as long as it can shift along the inclined face 981 of the hole 98.

In these Embodiments 1 to 3, the case 1 includes the holes 92, 95 and 98 to store the limiting members 91, 94 and 97, respectively, therein. Instead, the case 1 may not include the holes 92, 95 and 98, but may include an inclined face that is inclined obliquely upward from the rear-face side to the front-face side of the case 1 and a rotation center of the limiting member 94 at the upper face of the case 1.

In these Embodiments, the lock mechanism 9 is provided at an end portion on the front-face side of the document loading platen 42, which is not a limiting example.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

REFERENCE SIGNS LIST

1 Case
10 Transportable image forming apparatus
100 Magnet catch
2 Handle
4 Document cover
41 Rear-face side end
42 Document loading platen
9 Lock mechanism
91, 94, 97 Limiting member
912, 942, 972, 973 Convexity
943 Center
92, 98 Hole
921, 981 Inclined face
93, 96, 991, 992 Hole
931, 961 Concavity

The invention claimed is:

1. A transportable image processing apparatus, comprising:
    a main body having a front face and a rear face, the main body being provided with, at an upper face thereof, a document loading platen to load a document thereon;
    a document cover that rotates around an end of the main body on the rear-face side as a rotation center to open/close an upper part of the document loading platen; and
    a limiting portion configured such that, when the main body is installed in a vertical state so as to direct the rear face side of the main body upward to let the document loading platen vertical, limits rotation of the document cover from a state of closing the upper part of the document loading platen, and when the main body is installed in a horizontal state to let the document loading platen horizontal, allows rotation of the document cover,
    wherein
    the limiting portion includes a limiting member that shifts due to a self weight thereof to a limiting position so as to engage with the document cover when orientation of the main body is in the vertical state and shifts due to a self weight thereof to a retraction position so as not to engage with the document cover when orientation of the main body is in the horizontal state.

2. The transportable image processing apparatus according to claim 1, wherein
    the limiting portion further includes a U-shaped first engaging part that is open on the rear-face side of the main body, the first engaging part being included in the document cover, and an inclined face that is inclined obliquely upward from the rear-face side to the front-face side of the main body, the inclined face being included in the main body, and
    the limiting member includes a second engaging part including a key-shaped protrusion directed to the front-face side of the main body and a contact face that comes into contact with the inclined face in a predetermined range, and at the limiting position, the second engaging part engages with the first engaging part and at the retraction position, the second engaging part does not engage with the first engaging part.

3. The transportable image processing apparatus according to claim 2, wherein the limiting portion is disposed in a vicinity of one end on a front-face side of the document loading platen.

4. The transportable image processing apparatus according to claim 3, further comprising a handle attached on the rear-face side of the main body.

5. The transportable image processing apparatus according to claim 2, further comprising a handle attached on the rear-face side of the main body.

6. The transportable image processing apparatus according to claim 1, wherein
    the limiting portion further includes a U-shaped first engaging part that is open on the rear-face side of the main body, the first engaging part being included in the document cover, and
    the limiting member includes a free end that rotates about a rotation center in a same direction as the rotation center of the document cover and a second engaging part at the free end, the second engaging part including a key-shaped protrusion directed to the front-face side of the main body when the limiting member is in the limiting position, and at the limiting position, the second engaging part engages with the first engaging part and at the retraction position, the second engaging part does not engage with the first engaging part.

7. The transportable image processing apparatus according to claim 6, wherein the limiting portion is disposed in a vicinity of one end on a front-face side of the document loading platen.

8. The transportable image processing apparatus according to claim 7, further comprising a handle attached on the rear-face side of the main body.

9. The transportable image processing apparatus according to claim 6, further comprising a handle attached on the rear-face side of the main body.

10. The transportable image processing apparatus according to claim 1, wherein
    the limiting portion includes a concavity at a lower face of the document cover and a magnet catch to suck the document cover and the main body, and
    the limiting member includes a convexity to engage with the concavity of the document cover, and at the limiting position, the convexity engages with the concavity of the document cover and at the retraction position, the convexity does not engage with the concavity of the document cover.

11. The transportable image processing apparatus according to claim 10, wherein the limiting portion is disposed in a vicinity of one end on a front-face side of the document loading platen.

12. The transportable image processing apparatus according to claim 11, further comprising a handle attached on the rear-face side of the main body.

13. The transportable image processing apparatus according to claim 10, further comprising a handle attached on the rear-face side of the main body.

14. The transportable image processing apparatus according to claim 1, wherein the limiting portion is disposed in a vicinity of one end on a front-face side of the document loading platen.

15. The transportable image processing apparatus according to claim 14, further comprising a handle attached on the rear-face side of the main body.

16. The transportable image processing apparatus according to claim 1, further comprising a handle attached on the rear-face side of the main body.

* * * * *